United States Patent
Bertrand (10) Patent No.: US 12,307,069 B2
(45) Date of Patent: May 20, 2025

(54) METHOD FOR INCREASING SAFETY DURING THE OPERATION OF A DEVICE

(71) Applicant: Bayerische Motoren Werke Aktiengesellschaft, Munich (DE)

(72) Inventor: Bjoern Bertrand, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/546,660

(22) PCT Filed: Feb. 1, 2022

(86) PCT No.: PCT/EP2022/052364
§ 371 (c)(1),
(2) Date: Aug. 16, 2023

(87) PCT Pub. No.: WO2022/175077
PCT Pub. Date: Aug. 25, 2022

(65) Prior Publication Data
US 2025/0077042 A1    Mar. 6, 2025

(30) Foreign Application Priority Data
Feb. 17, 2021 (DE) .................. 10 2021 103 690.9

(51) Int. Cl.
*G06F 3/04817* (2022.01)
*G06F 3/01* (2006.01)
*G06F 3/0484* (2022.01)

(52) U.S. Cl.
CPC .......... *G06F 3/04817* (2013.01); *G06F 3/017* (2013.01); *G06F 3/0484* (2013.01)

(58) Field of Classification Search
CPC ..... G06F 3/04817; G06F 3/017; G06F 3/0484
(Continued)

(56) References Cited

U.S. PATENT DOCUMENTS

| 8,745,544 B2* | 6/2014 | Chaudhri | G06F 3/017 |
| | | | 345/173 |
| 2011/0107272 A1* | 5/2011 | Aguilar | G06F 3/04883 |
| | | | 345/173 |

(Continued)

FOREIGN PATENT DOCUMENTS

| DE | 11 2006 003 515 T5 | 10/2008 |
| DE | 11 2014 000 351 T5 | 9/2015 |

(Continued)

OTHER PUBLICATIONS

PCT/EP2022/052364, International Search Report dated Jun. 17, 2022 (Two (2) pages).

(Continued)

Primary Examiner — Kerri L McNally
(74) Attorney, Agent, or Firm — Crowell & Moring LLP (57) ABSTRACT

A method for increasing safety during the operation of a device. Multiple widgets are displayed on a graphical user interface. Each widget is assigned an operating function of the device; each operating function is selectable by selecting the corresponding widget via an input gesture of a user. Data relating to a current situation is detected, and it is determined whether increased attention is required in the current situation based on the data. If increased attention is required, the widgets are arranged such that each widget is assigned a simple input gesture which differs greatly from input gestures assigned to other displayed widgets in order to increase safety during the operation of the device.

15 Claims, 5 Drawing Sheets

(58) Field of Classification Search
USPC .......................................................... 340/439
See application file for complete search history.

(56) References Cited

U.S. PATENT DOCUMENTS

| | | | | |
|---|---|---|---|---|
| 2013/0067407 | A1* | 3/2013 | Dehmann | G11B 27/34 |
| | | | | 715/810 |
| 2013/0190056 | A1* | 7/2013 | Chaudhri | H04M 1/663 |
| | | | | 455/566 |
| 2014/0309806 | A1* | 10/2014 | Ricci | G06F 21/31 |
| | | | | 701/1 |
| 2015/0002461 | A1* | 1/2015 | Guarneri | G06F 3/04886 |
| | | | | 345/174 |
| 2015/0339031 | A1* | 11/2015 | Zeinstra | B60K 35/10 |
| | | | | 715/747 |
| 2016/0023604 | A1* | 1/2016 | Jenson | G06F 3/0482 |
| | | | | 345/7 |
| 2017/0028850 | A1* | 2/2017 | Miller | B60K 35/22 |
| 2017/0102774 | A1* | 4/2017 | Naruse | G06F 3/017 |
| 2019/0234755 | A1* | 8/2019 | Zhang | G01C 21/3664 |

FOREIGN PATENT DOCUMENTS

| | | |
|---|---|---|
| DE | 10 2014 118 957 A1 | 6/2016 |
| DE | 10 2015 005 853 A1 | 11/2016 |
| DE | 10 2016 114 669 A1 | 2/2018 |
| DE | 10 2017 211 378 A1 | 1/2019 |

OTHER PUBLICATIONS

German Search Report issued in German application No. 10 2021 103 690.9 dated Jan. 28, 2022, with Statement of Relevancy (Seven (7) pages).

* cited by examiner

METHOD FOR INCREASING SAFETY DURING THE OPERATION OF A DEVICE

BACKGROUND AND SUMMARY OF THE INVENTION

This application is a 371 of International Application No. PCT/EP2022/052364, filed Feb. 1, 2022 which claims priority under 35 U.S.C. § 119 from German Patent Application No. 10 2021 103 690.9, filed Feb. 17, 2021, the entire disclosure of which is herein expressly incorporated by reference.

The invention relates to a method for increasing safety during the operation of a device, with which method safety can be increased during an operation, in particular when a current situation requires increased attention.

For example, motor vehicles usually have a large number of technical devices which a user can operate at will. Examples of such devices are a radio, a navigation system, a motor vehicle telephone or a hands-free device integrated in the motor vehicle, or an air conditioning system.

These devices can be operated via input units which receive input gestures assigned to individual operating functions, i.e., operating or settable functions of a device, and are coupled to the device in such a way that the operating function can be selected on the basis of a received input gesture and this can then be set or controlled accordingly.

Furthermore, a separate input apparatus can be provided for each device or one input apparatus can be provided which can be coupled alternately with one of several devices. For example, such an input apparatus can be used to alternately set the volume of a radio, answer a call, or specify a desired room temperature for an air conditioning system.

However, such input apparatuses usually require a user to focus strongly on them. In individual situations, for example when controlling a motor vehicle, it is important that the user focuses their attention and concentration completely on the control of the motor vehicle. Accordingly, such input apparatuses should attract the user's concentration as little as possible so as not to distract them unnecessarily. At the same time, however, safe operation of at least the most important devices must be ensured.

In document DE 10 2015 005 853 A1 an electronic system for planning and executing a mission to be performed with a vehicle is known, wherein the system comprises a first display unit equipped with a touch-sensitive screen and two separate operating modes, wherein in a planning mode the screen of the first display unit is set up for input and output, and in an execution mode the screen of the first display unit is arranged exclusively for indirect input by gesture control in the manner of a multi-touchpad, and a second display unit, wherein the first and second display units cooperate in such a way that the inputs which can be made via the screen of the first display unit in the execution mode serve to control a display on the second display unit.

The object of embodiments of the invention is to provide a method for increasing safety during the operation of a device, with which method safety can be increased during an operation, in particular when a current situation requires increased attention.

This object is achieved by the subject of the coordinated claims. Further advantageous developments are the subject of the dependent claims.

According to one embodiment of the invention, this object is achieved by a method for increasing safety during the operation of a device, wherein a plurality of widgets are displayed on a graphical user interface, wherein each widget is assigned an operating function of the device, and wherein each operating function can be selected by selecting the corresponding widget by means of an input gesture that can be carried out by a user. Here, data relating to a current situation is first detected, and it is determined whether increased attention is required in the current situation on the basis of the data relating to the current situation. If it is determined that increased attention is required in the current situation, widgets displayed on the graphical user interface are arranged such that each widget is assigned a simple input gesture which differs greatly from input gestures assigned to other displayed widgets in order to increase safety during the operation of the device.

In this context, a graphical user interface is understood to mean a user interface that is designed to make it possible to operate a device, for example a radio, a navigation system, a motor vehicle telephone or a hands-free system integrated in a motor vehicle, or an air conditioning system, by means of graphical symbols, so-called widgets. The device can then be operated or the corresponding selection can be made, for example, by means of a control device, such as a trackball or a touchpad, wherein the control device can be designed in particular to move a displayed cursor accordingly in response to received or detected input gestures in order to select a widget. A widget can be selected here by moving the cursor in the direction of the corresponding widget in response to an input gesture. Furthermore, assignments between widgets and input gestures assigned to the individual widgets can be stored in a memory, for example in the form of a look-up table.

The graphical user interface can further be displayed, for example, on an instrument cluster or a head-up display of a motor vehicle.

Operating functions are also control elements and other elements or pieces of information that are required for the completion of a task or the corresponding operation of the device and that are selectable, realizable or controllable by means of the widgets and the corresponding input gestures.

Overall, a method for increasing safety during the operation of a device is thus disclosed, with which method safety during the operation can be increased in particular when a current situation requires increased attention. Thus, by arranging widgets displayed on the graphical user interface in such a way that each widget is assigned to a simple input gesture which differs greatly from input gestures assigned to other displayed widgets, a fast and precise interaction with the individual widgets is enabled and a cognitive load when selecting the widgets can be significantly reduced. This has the advantage that the corresponding input apparatus draws the attention and concentration of a user to the least extent possible, and the user can rather focus their full attention on the situation requiring their attention.

Situations in which increased attention is required may involve, for example, driving a motor vehicle. Thus, while driving, a driver's view to the outside should be continuous, i.e., as uninterrupted as possible. In this case, the input gestures can be detected, for example, by means of a trackball attached to the steering wheel of the motor vehicle, whereas the graphical user interface can be displayed on an instrument cluster or a head-up display of the motor vehicle. However, a situation in which increased attention is required is also given, for example, if a user performing the input gestures is wearing gloves and the input gestures can only be received or detected with difficulty and no longer precisely.

Simple input gestures are also understood here to mean, for example, gestures that have a small or reduced number of degrees of freedom. In particular, simple input movements are understood to mean rotational movements or linear movements in particular. An example of such a simple input gesture is, for example, a forward or backward movement with a finger and/or hand. The fact that individual input gestures differ greatly means that they differ significantly and that individual input gestures that can be used to select displayed widgets can be easily distinguished from one another without much effort.

Further, confidence intervals in the assignment of detected input gestures to individual widgets can be set such that, if it is determined that increased attention is required in the current situation, each detected input gesture can be assigned to a widget.

Such a confidence interval or confidence range specifies here the range within which recorded input gestures are still assigned to a widget, even though they do not correspond exactly to the input gesture assigned to the widget.

This has the advantage that a corresponding input apparatus does not unnecessarily draw the concentration or attention of a user in situations in which increased attention is generally required, in particular by not unnecessarily prompting the user to perform an input gesture again if a previously detected input gesture does not correspond exactly to an input gesture assigned to a widget. Rather, widgets and corresponding operating functions can also be selected already by fast, motorically sloppy input gestures. In particular, this simplifies the operation of a device in cases in which an input unit for detecting input gestures executed by a user and a display unit on which the graphical user interface is displayed move relative to each other, that is to say, for example, if the input unit is a trackball arranged on a steering wheel of a motor vehicle.

In one embodiment, the method further comprises reducing a number of widgets displayed on the graphical user interface compared to a state in which increased attention is not required if it is determined that increased attention is required in the current situation. This has the advantage that users can quickly orient themselves in situations in which increased attention is required, for example during the operation of a motor vehicle, and do not have to spend a long time getting an overview of the widgets displayed in order to operate the device. The selection of the widgets, which are still to be displayed in situations in which increased attention is required, can be made here by artificial intelligence on the basis of widgets and corresponding operating functions which a user has selected in comparable situations in the past. Furthermore, in situations in which increased attention is required, only those widgets can be displayed which are assigned to operating functions that are absolutely necessary for the regular operation of the device and/or the motor vehicle. Furthermore, a displayed call list may, for example, also display only the last five connections.

In addition, if it is determined that increased attention is required in the current situation, at least one piece of information relating to the input gestures assigned to the displayed widgets may be presented.

The at least one piece of information may in particular be a graphical representation or a description of an input gesture presented on a display apparatus or on the graphical user interface. Furthermore, the at least one piece of information can also be presented on a display unit formed on the corresponding input unit.

Such graphical representations are usually very easy to understand and enable a user to get an overview in a very short time and to recognize which input gesture must be executed to select a specific operating function. This enables the user to quickly understand possible input gestures without having to focus their attention and/or concentration for an unnecessarily long time on a corresponding input apparatus or the graphical user interface.

It is also possible here for the at least one piece of information, i.e., a corresponding operating aid, to be displayed only temporarily, for example for 1.5 seconds.

A detected input gesture can also be displayed in real time on a display apparatus. It can thus be immediately signaled to a user whether the executed input gesture also corresponds to the input gesture that they wanted to execute. Thus, the user can quickly assess the situation without having to permanently focus their attention and concentration on a corresponding input apparatus. Furthermore, this enables a better understanding of the corresponding interaction input and, for example, a kinetic sensation at a trackball can be better matched with a corresponding visual result.

Furthermore, in addition to executing an input gesture assigned to a widget, a confirmation action may be required to select the control function assigned to the corresponding widget. This can, for example, ensure that an input gesture executed by a user is actually assigned to the desired operating function without the user having to execute an input gesture repeatedly until it is actually assigned to the desired operating function because it could not be assigned unambiguously. At the same time, possible misinterpretation as a result of a user having focused their attention and concentration on other circumstances and having executed an input gesture in a motorically sloppy manner is avoided. Furthermore, it is also possible, however, that an assignment of detected input gestures to widgets and corresponding operating functions only takes place after a user has performed a corresponding confirmation action. This can ensure, for example, that an input gesture detected during the operation of a motor vehicle is not inadvertently assigned to a corresponding operating function, even though the user does not actually want to operate the device.

Furthermore, a feedback signal can be output after a control function assigned to a widget has been selected. This can signal to a user that a control function has actually been selected in response to an input gesture executed by them, so that they can fully focus their attention again on the situation requiring attention, for example road traffic when driving a motor vehicle. The feedback signal can be output here haptically, visually or in the form of audio, for example.

With a further embodiment of the invention, an input apparatus for increasing safety during the operation of a device is also specified, wherein the input apparatus has a graphical user interface on which a plurality of widgets are displayed, wherein each widget is assigned an operating function of the device, and wherein each operating function can be selected by selecting the corresponding widget by an input gesture that can be executed by a user. Here, the input apparatus further comprises an input unit, which is designed to receive input gestures executed by a user, a detection unit, which is designed to detect data relating to a current situation, a determination unit, which is designed to determine whether increased attention is required in the current situation on the basis of the data relating to the current situation, and a user interface control module, which is designed to arrange the widgets displayed on the graphical user interface such that each widget is assigned to a simple input gesture which differs greatly from input gestures assigned to other displayed widgets, in order to increase safety during the operation of the device if it is determined by the determination unit that increased attention is required in the current situation.

Thus, an input apparatus for increasing safety during the operation of a device is disclosed, with which input apparatus safety during an operation can be increased in particular when a current situation requires increased attention. Thus, by arranging widgets displayed on the graphical user interface in such a way that each widget is assigned to a simple input gesture which differs greatly from input gestures assigned to other displayed widgets, a fast and precise interaction with the individual widgets is enabled and a cognitive load when selecting the widgets can be significantly reduced. This has the advantage that the corresponding input apparatus can minimize the concentration required of a user, and the user can rather focus their full attention on the situation requiring their attention.

Situations in which increased attention is required may, for example, again involve driving a motor vehicle. For example, during driving, the driver's view of the outside world should be continuous, i.e., preferably uninterrupted. The input gestures can be detected here, for example, by means of a trackball attached to the steering wheel of the motor vehicle, whereas the graphical user interface can be displayed on an instrument cluster or a head-up display of the motor vehicle. However, a situation in which increased attention is required is also given, for example, if a user performing the input gestures is wearing gloves and the input gestures can only be received or detected with difficulty and no longer precisely.

Simple input gestures are understood here to mean, for example, gestures that have a small or reduced number of degrees of freedom. In particular, simple input movements are understood to mean rotational movements or linear movements. An example of such a simple input gesture is, for example, a forward or backward movement with a finger and/or hand. The fact that individual input gestures differ greatly means that they differ significantly and that individual input gestures that can be used to select displayed widgets can be easily distinguished from one another without much effort.

In this context, the user interface control module can be further configured to set confidence intervals in the assignment of detected input gestures to individual widgets in such a way that each input gesture detected by the input unit can be assigned to a widget if it is determined by the determination unit that increased attention is required in the current situation. This has the advantage that the input apparatus does not unnecessarily draw the concentration or attention of a user in situations in which increased attention is generally required, in particular by not unnecessarily prompting the user to perform an input gesture again if a previously detected input gesture does not correspond exactly to an input gesture assigned to a widget. Rather, widgets and corresponding operating functions can also already be selected by quick, motorically sloppy input gestures. In particular, this simplifies the operation of a device in cases in which an input unit for detecting input gestures executed by a user and a display unit on which the graphical user interface is displayed move relative to each other, that is, for example, if the input unit is a trackball arranged on a steering wheel of a motor vehicle.

In one embodiment, the user interface control module is further configured to reduce the number of widgets displayed on the graphical user interface compared to a state in which no increased attention is required if it is determined by the determination unit that increased attention is required in the current situation. This has the advantage that users can quickly orient themselves in situations in which increased attention is required, for example during the operation of a motor vehicle, and does not have to first obtain an overview of the widgets displayed, which is a lengthy process, in order to operate the device. The selection of the widgets, which are still to be displayed in situations in which increased attention is required, can be made here by artificial intelligence on the basis of widgets and corresponding operating functions which a user has selected in comparable situations in the past. Furthermore, in situations in which increased attention is required, only those widgets can be displayed which are assigned to operating functions that are absolutely necessary for the regular operation of the device and/or the motor vehicle. Furthermore, a displayed call list can, for example, also display only the last five connections.

In addition, the user interface control module may also be configured to present at least one piece of information relating to the input gestures assigned to the displayed widgets on a display apparatus if it is determined by the determination unit that increased attention is required in the current situation.

The at least one piece of information may in turn be, in particular, a graphical representation or, on a display apparatus or on the graphical user interface, a description of an input gesture.

The display apparatus may further be the display apparatus on which the graphical user interface is also presented. Thus, the display apparatus may be, for example, an instrument cluster or a head up display of a motor vehicle. Further, however, the display apparatus may also be a separate display apparatus, wherein the display apparatus is preferably arranged close to a viewing area of an area requiring increased attention, for example as close as possible to a windshield of a motor vehicle, but without restricting the view of the area requiring increased attention. In addition, however, the display apparatus may also be a display apparatus formed on the input unit.

Such graphical representations are usually very easy to understand and enable a user to get an overview in a very short time and to recognize which input gesture must be executed to select a specific operating function. This enables the user to quickly understand possible input gestures without having to focus their attention and/or concentration on the input apparatus or the graphical user interface for an unnecessarily long time.

In this context, the user interface control module can in turn be designed in such a way that the at least one piece of information, i.e., a corresponding operating aid, is displayed only temporarily, for example for 1.5 seconds.

The input apparatus can also have a display module that is designed to display an input gesture detected by the input unit in real time on a display apparatus. It can thus be immediately signaled to the user whether the executed input gesture also corresponds to the input gesture that they wanted to execute. Thus, the user can quickly assess the situation without having to permanently focus their attention and concentration on the input apparatus. Furthermore, this enables a better understanding of the corresponding interaction input and, for example, a kinetic sensation at a trackball can be better matched with a corresponding visual result.

The display apparatus can in turn be the display apparatus on which the graphical user interface is also presented. Thus, the display apparatus can be, for example, an instrument cluster or a head-up display of a motor vehicle. Furthermore, the display apparatus can also be a separate display apparatus.

Furthermore, the input apparatus may further comprise a confirmation element configured to detect a confirmation action of a user, wherein the user interface control module is further configured to select a control function assigned to a widget only if a corresponding input gesture is detected by the input unit and a confirmation action is detected by the confirmation element. This can ensure, for example, that an input gesture executed by a user is actually also assigned to the desired operating function, without the user having to repeatedly execute an input gesture until it is actually also assigned to the desired operating function because it could not be uniquely assigned. At the same time, possible misinterpretation as a result of a user having focused their attention and concentration on other circumstances and having executed an input gesture in a motorically sloppy manner is avoided. Furthermore, however, it is also possible that an assignment of detected input gestures to widgets and corresponding operating functions only takes place after a user has performed a corresponding confirmation action. This can ensure, for example, that an input gesture detected during the operation of a motor vehicle is not inadvertently assigned to a corresponding operating function, even though the user does not actually want to operate the device.

In addition, the input apparatus can also have a feedback transmitter that is designed to output a feedback signal once an operating function assigned to a widget has been selected. This can signal to a user that an operating function has actually been selected in response to an input gesture executed by them, so that they can focus their attention fully on the situation requiring attention again, for example road traffic when driving a motor vehicle. The feedback transmitter can be designed here, for example, to output the feedback signal haptically, visually, or in the form of audio.

With a further embodiment of the invention, a motor vehicle which has an input apparatus described above is additionally also disclosed.

Thus, a motor vehicle is specified which has an input apparatus with which safety can be increased during the operation, in particular when a current situation requires increased attention. Thus, by arranging widgets displayed on the graphical user interface in such a way that each widget is assigned to a simple input gesture which differs greatly from input gestures assigned to other displayed widgets, a fast and precise interaction with the individual widgets is enabled and a cognitive load when selecting the widgets can be significantly reduced. This has the advantage that the corresponding input apparatus draws as little of a user's concentration as possible, and the user can rather focus their full attention on the situation requiring their attention.

In summary, it can be noted that the present invention discloses a method for increasing safety during the operation of a device, which method can be used to increase safety during an operation, particularly when a current situation requires increased attention.

Thus, by arranging widgets displayed on the graphical user interface in such a way that each widget is assigned a simple input gesture which differs greatly from input gestures assigned to other displayed widgets, fast and precise interaction with individual widgets is enabled and a cognitive load when selecting widgets can be significantly reduced.

In addition, the method can further be designed to enable the user to quickly orient on the graphical user interface and to quickly understand the input gestures required to select operating functions.

Overall, an input apparatus is thus specified with which a robust input is ensured with simultaneously clear visualization of corresponding interaction possibilities.

The invention will now be explained in greater detail with reference to the accompanying figures.

DETAILED DESCRIPTION OF THE DRAWINGS

Figure 1:
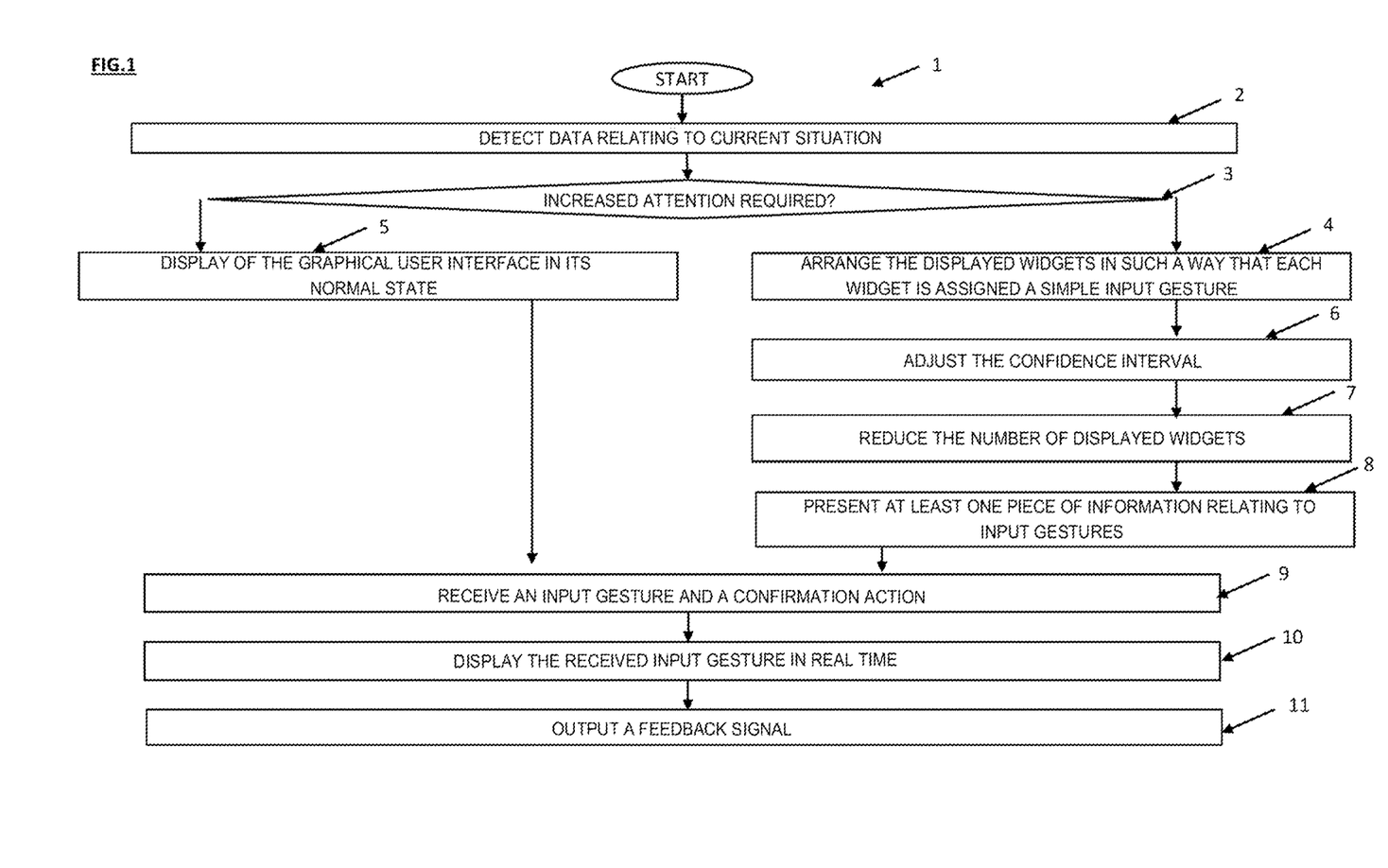
FIG. 1 shows a flow diagram of a method for increasing safety during the operation of a device according to embodiments of the invention.

FIG. 1 shows a flow diagram of a method 1 for increasing safety during the operation of a device according to embodiments of the invention.

In particular, FIG. 1 shows a method 1 for increasing safety during the operation of a device, wherein a plurality of widgets are displayed on a graphical user interface, wherein each widget is assigned an operating function of the device, and wherein each operating function can be selected by selecting the corresponding widget by an input gesture that can be carried out by a user.

For example, motor vehicles usually have a large number of technical devices that a user can operate at will. Examples of such devices are a radio, a navigation system, a motor vehicle telephone or a hands-free device integrated in the motor vehicle, or an air conditioning system.

These devices can be operated via input units that receive input gestures assigned to individual operating functions, i.e., operating or adjustable functions of a device, and are coupled to the device in such a way that the operating function can be selected on the basis of a received input gesture and this can then be set or controlled accordingly. The input units can be, for example, a touchpad or a trackball arranged on a steering wheel of the motor vehicle.

In individual situations, for example when controlling a motor vehicle, it is important that the user focuses their attention and concentration completely on controlling the vehicle. Corresponding input apparatuses should draw the user's concentration as little as possible so as not to distract them unnecessarily. At the same time, however, safe operation of at least the most important devices must be ensured.

According to the embodiments of FIG. 1, the method 1 comprises a step 2 of detecting data relating to a current situation and a subsequent step 3 of determining whether increased attention is required in the current situation on the basis of the acquired data relating to the current situation. If it is determined that increased attention is required in the current situation, in a step 4, widgets displayed on the graphical user interface are subsequently arranged such that each widget is assigned a simple input gesture which differs greatly from input gestures assigned to other displayed widgets in order to increase safety during the operation of the device.

If, on the other hand, it is determined in step 3 that no increased attention is required in the current situation, an input apparatus is operated in its normal state according to the embodiments of FIG. 1 and, in a step 5, the graphical user interface is displayed as originally stored and preconfigured and without changes or corresponding adaptation.

Situations in which increased attention is required may involve, for example, driving a motor vehicle. Thus, while driving, a driver's view to the outside should be continuous, i.e. as uninterrupted as possible. In this case, the input gestures can be detected, for example, by means of a trackball attached to the steering wheel of the motor vehicle, whereas the graphical user interface can be displayed on an instrument cluster or a head-up display of the motor vehicle. However, a situation in which increased attention is required is also given, for example, if a user performing the input gestures is wearing gloves and the input gestures can only be received or detected with difficulty and no longer precisely.

Simple input gestures are also understood here to mean, for example, gestures that have a small or reduced number of degrees of freedom. In particular, simple input movements are understood to mean rotational movements or linear movements in particular. An example of such a simple input gesture is, for example, a forward or backward movement with a finger and/or hand. The fact that individual input gestures differ greatly means that they differ significantly and that individual input gestures that can be used to select displayed widgets can be easily distinguished from one another without much effort.

FIG. 1 shows here a further step 6 of detecting an input gesture performed by a user, wherein, according to the embodiment of FIG. 1, confidence intervals in the assignment of detected input gestures to individual widgets are set such that, if it is determined that increased attention is required in the current situation, any detected input gesture can be assigned to a widget.

According to the embodiments of FIG. 1, the method 1 also comprises a further step 7 of reducing a number of widgets displayed on the graphical user interface compared to a state in which no increased attention is required, that is to say, compared to the preconfigured normal state if it is determined that increased attention is required in the current situation.

The selection of the widgets, which are to be displayed even in situations in which increased attention is required, can be carried out by artificial intelligence on the basis of widgets and corresponding operating functions that a user has selected in comparable situations in the past. The training of a corresponding artificial neural network can be done, for example, on the basis of past selections of widgets or corresponding operating functions by a user in comparable situations as input variables. If there are different users of the corresponding input apparatus, a separate artificial neural network can also be trained for each user. Furthermore, in situations in which increased attention is required, only those widgets can be displayed which are assigned to operating functions that are absolutely necessary for the regular operation of the device and/or the motor vehicle.

As FIG. 1 shows, the method 1 further comprises a step 8 of presenting at least one piece of information relating to the input gestures assigned to the displayed widgets if it is determined that increased attention is required in the current situation.

The at least one piece of information can, in particular, be a graphical representation or a description of an input gesture on a display apparatus or on the graphical user interface. Furthermore, information relating to selectable operating functions can also be presented to a user with the at least one piece of information.

Further, the method comprises a step 9 of displaying a detected input gesture in real time on a display apparatus.

Also, according to the embodiments of FIG. 1, in a step 10, in addition to an input gesture performed by a user, a confirmation action performed by the user is also received, wherein such confirmation action is required to select the control function assigned to the corresponding widget.

Furthermore, the method 1 also comprises a step 11 of outputting a feedback signal after an operating function assigned to a widget has been selected. The feedback signal can be output, for example, haptically, visually, or in the form of audio. For example, a brightness of a display on which the graphical user interface is displayed may be increased, or the display may flash.

Figure 2:
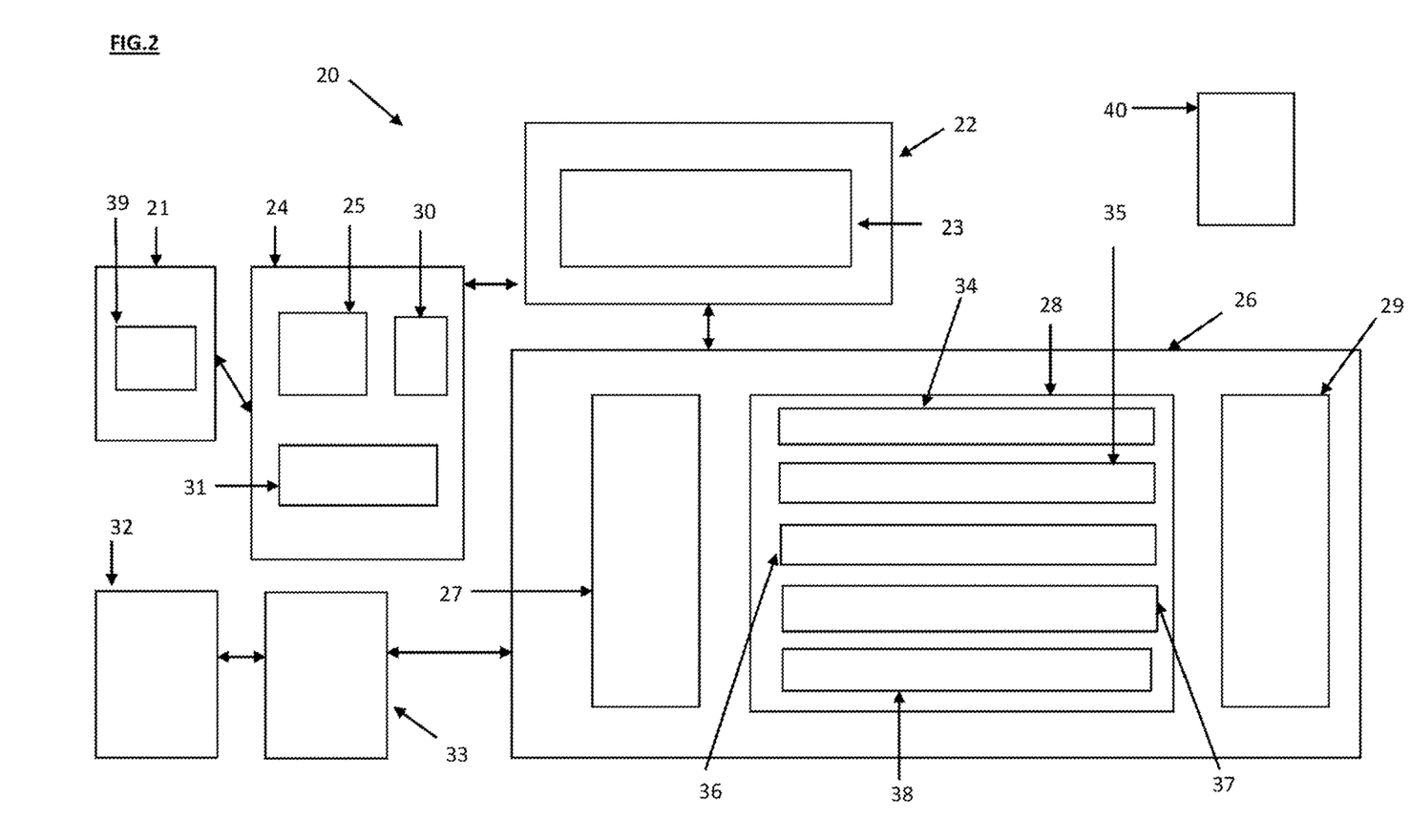
FIG. 2 shows a block diagram of an input apparatus for increasing safety during the operation of a device according to embodiments of the invention.

FIG. 2 shows a block diagram of an input apparatus 20 for increasing safety during the operation of a device according to embodiments of the invention.

In particular, FIG. 2 shows an input apparatus 20 comprising an input unit 21 and a display unit 22 coupled to the input unit 21. Further, the input apparatus 20 has a graphical user interface 23 displayed on the display unit 22, wherein a device can be operated via the graphical user interface 23 or a user can interact with the device via the graphical user interface by displaying operating parameters of the device on the graphical user interface 23 and receiving control inputs from a user via the input unit 21 for correspondingly controlling operating functions of the device.

As further shown in FIG. 2, the input apparatus 20 comprises a microcontroller 24 having an integrated memory 25 and a user interface control module 26, wherein the individual components of the input apparatus 20 are communicatively coupled to each other, for example by means of inter-process communication, wireless communication, shared memory areas, a bus, or the like.

The memory 25 contains control information in the form of a script with window description source text that defines elements or widgets of the graphical user interface 23 and specifies their features or properties, such as appearance and behavior. In addition, the memory 25 contains a repository that contains text, graphics and sound resources required for the graphical user interface 23, which are to be displayed in the graphical user interface 23.

As can be seen, the user interface control module 26 further comprises an interpreter 27, a GUI manager 28, and an interface 29 to at least one device to be controlled or operated by the input apparatus 20. The interface 29 is designed to create a logical interface between corresponding applications running on the device, the individual operating functions and the GUI script, i.e. the control information. The interface 29 is based here on the three functional elements of event, action and data.

As FIG. 2 further shows, the microcontroller 24 has a graphics interface 30 via which it is connected to the display unit 22.

According to the embodiments of FIG. 2, the input unit 21 is further designed here to detect input gestures executed by a user, wherein the input apparatus 20 has an assignment unit 31 for assigning a detected input gesture to a control command, for example a command for moving or shifting a cursor displayed on the display unit, or a command for selecting a displayed widget or an application assigned to a widget displayed on the graphical user interface 23, for example an operating function of a device. The assignment within the assignment unit 31 can be made, for example, on the basis of one or more look-up tables stored in the memory 25 or a separate memory. According to the embodiments of FIG. 2, the assignment unit 31 is formed within the microcontroller 24. However, the assignment unit can also be formed, for example, within the input unit.

According to the embodiments of FIG. 2, the input unit 21 is in this case a trackball arranged on a steering wheel of a motor vehicle and communicates wirelessly with the display unit 22. Input gestures of a user detected via the trackball are detected and, for example, assigned to corresponding displacements of a cursor displayed on the display unit 22. The display unit 22 is also a display unit of an instrument cluster of the motor vehicle.

As shown in FIG. 2, the illustrated input apparatus 20 further comprises a detection unit 32, which is designed to detect data relating to a current situation, and a determination unit 33, which is designed to determine whether increased attention is required in the current situation on the basis of the data detected by the detection unit 32. According to the embodiments of FIG. 2, the detection unit 32 has optical sensors to detect ambient data. Further, according to the embodiments of FIG. 2, the detection unit 32 is coupled to an engine control unit of the motor vehicle to detect whether the motor vehicle is currently in operation. The determination unit 33 may in particular be a unit or module comprising a processor and a memory, wherein code that can be carried out by the processor is stored in the memory to determine whether increased attention is required in the current situation on the basis of data detected by the detection unit 32.

In addition, the depicted user interface control module 26 has an arrangement module 34 configured to arrange the widgets depicted on the graphical user interface 23 such that each widget is assigned a simple input gesture which differs greatly from input gestures assigned to other depicted widgets in order to increase safety during the operation of the device if it is determined by the determination unit 33 that increased attention is required in the current situation. For example, various look-up tables may be stored in this context, which are matched to the corresponding application and in which assignments between widgets displayed in the corresponding situation and their arrangement within the graphical user interface 23 are stored.

Also, the illustrated user interface control module 26 further comprises a confidence module 35 configured to set confidence intervals in the assignment of detected input gestures to individual widgets such that each input gesture detected by the input unit 21 can be assigned to a widget if it is determined by the determination unit 33 that increased attention is required in the current situation.

According to the embodiments of FIG. 2, the user interface control module 26 additionally comprises a reduction module 36 designed to reduce the number of widgets displayed on the graphical user interface compared to a state in which increased attention is not required if it is determined by the determination unit 32 that increased attention is required in the current situation.

The selection of the widgets which are still to be displayed even in situations in which increased attention is required can in this case be carried out by artificial intelligence on the basis of widgets and corresponding operating functions which a user has selected in comparable situations in the past, wherein information relating to situations detected in the past and information relating to which widgets or operating functions a user has selected in the past in the presence of a corresponding situation are provided as input variables to an artificial intelligence module, wherein the artificial intelligence module is designed to train an artificial neural network on the basis of these input variables. Furthermore, in situations in which increased attention is required, only widgets can be displayed which are assigned to operating functions that are absolutely necessary for the regular operation of the device and/or the motor vehicle, wherein corresponding assignments can be stored in a memory, for example.

In addition, the user interface control module 26 has a presentation module 37 that is configured to present at least one piece of information relating to the input gestures assigned to the displayed widgets on the display unit 22 if it is determined by the determination unit 33 that increased attention is required in the current situation. The information relating to the input gestures assigned to individual widgets may in turn be stored in a memory. In addition, the information relating to input gestures assigned to individual widgets is also preferably presented adjacent to or in close proximity to the corresponding widgets on the display unit 22.

As can also be seen, the illustrated user interface control module 26 further comprises a display module 38 configured to display an input gesture detected by the input unit 21 in real time on the display unit 22.

Also, the input apparatus 20 further comprises a confirmation element 39 designed to detect a confirmation action of a user. According to the embodiments of FIG. 2, the confirmation action is formed by a ball of the trackball, wherein the confirmation action comprises pressing the trackball. In this regard, the user interface control module 26 is further configured to select a control function assigned to a widget only, that is to say, to transmit corresponding control information to a device via the interface 29 only when a corresponding input gesture is detected by the input unit 21 and a confirmation action is detected by the confirmation element 39.

As FIG. 2 shows, the input apparatus 20 further comprises a feedback transmitter 40, which is designed to output a feedback signal after an operating function assigned to a widget has been selected. According to the embodiments of FIG. 2, the feedback transmitter 40 is in particular an acoustic signal transmitter.

Figure 3A:
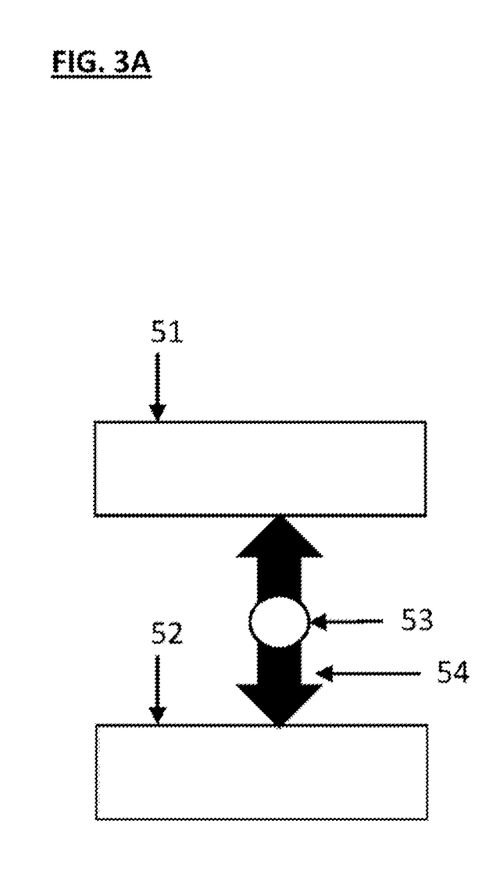
FIGS. 3A and 3B illustrate a method for increasing safety during the operation of a device according to one embodiment.
Figure 3B:
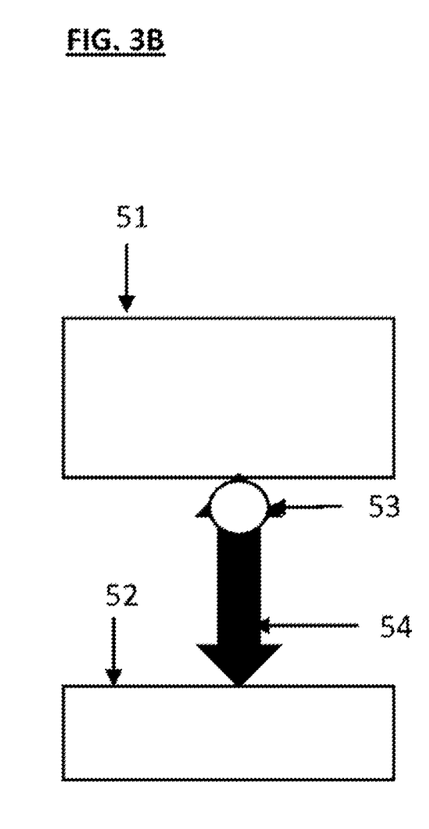

FIGS. 3A and 3B illustrate a method 50 for increasing safety during the operation of a device according to a first embodiment.

According to the first embodiment, two widgets 51, 52 are displayed here on a graphical user interface. In particular, the widgets 51, 52 are assigned functions of a motor vehicle telephone or a hands-free device integrated in a motor vehicle.

There is currently a situation present, during which increased attention is required. During this situation, only two widgets 51, 52 are displayed on the graphical user interface, wherein a user can accept an incoming call via a first widget 51 and reject the incoming call via a second widget 52.

A cursor 53 is also shown, which can be moved by input gestures detected via an input unit, for example a trackball arranged on the steering wheel of the motor vehicle, in order to select one of the two widgets 51, 52 and the corresponding operating function. In doing so, the cursor 53 can indicate the current finger position of a finger of a user.

According to the first embodiment, the widgets 51, 52 are further arranged on the graphical user interface in such a way that a simple input gesture is assigned to each widget 51, 52 in order to increase safety during the operation of the device. According to the first embodiment, the simple input gestures are input gestures that have only one degree of freedom and thus a reduced number of degrees of freedom, and in particular forward or backward movements with a finger and/or hand, or a corresponding forward or backward flicking of a trackball.

As FIGS. 3A and 3B show, information 54 relating to the input gestures assigned to the displayed widgets 51, 52 is also presented, wherein the information 54 is a graphical representation of the input gestures required to select the individual widgets 51, 52. According to the first embodiment, the information is presented between the two widgets 51, 52. Furthermore, the information can also be displayed adjacently to the displayed widgets, for example next to the two widgets.

FIG. 3A shows the graphical user interface during an incoming call, wherein the cursor 53 is shown between the two widgets 51, 52, wherein the incoming call can be accepted by moving a finger or hand forward or flicking a trackball forward, and wherein the incoming call can be rejected by moving a finger or hand backward or flicking a trackball backward.

FIG. 3B, in turn, shows the graphical user interface, wherein the cursor 53 is moved toward the first widget 51 by an appropriate input gesture to accept the incoming call.

As FIG. 3B shows, a visual feedback is generated after the call is accepted, wherein the visual feedback according to the first embodiment comprises an enlargement of the display of the first widget 51. Further, however, the feedback signal may also comprise, for example, a displacement of the first widget after the cursor has been moved to the first widget.

In particular, according to the first embodiment, the method is designed in such a way that an input gesture detected by a trackball arranged on a steering wheel of a motor vehicle can be reliably processed even during a steering movement.

Figure 4A:
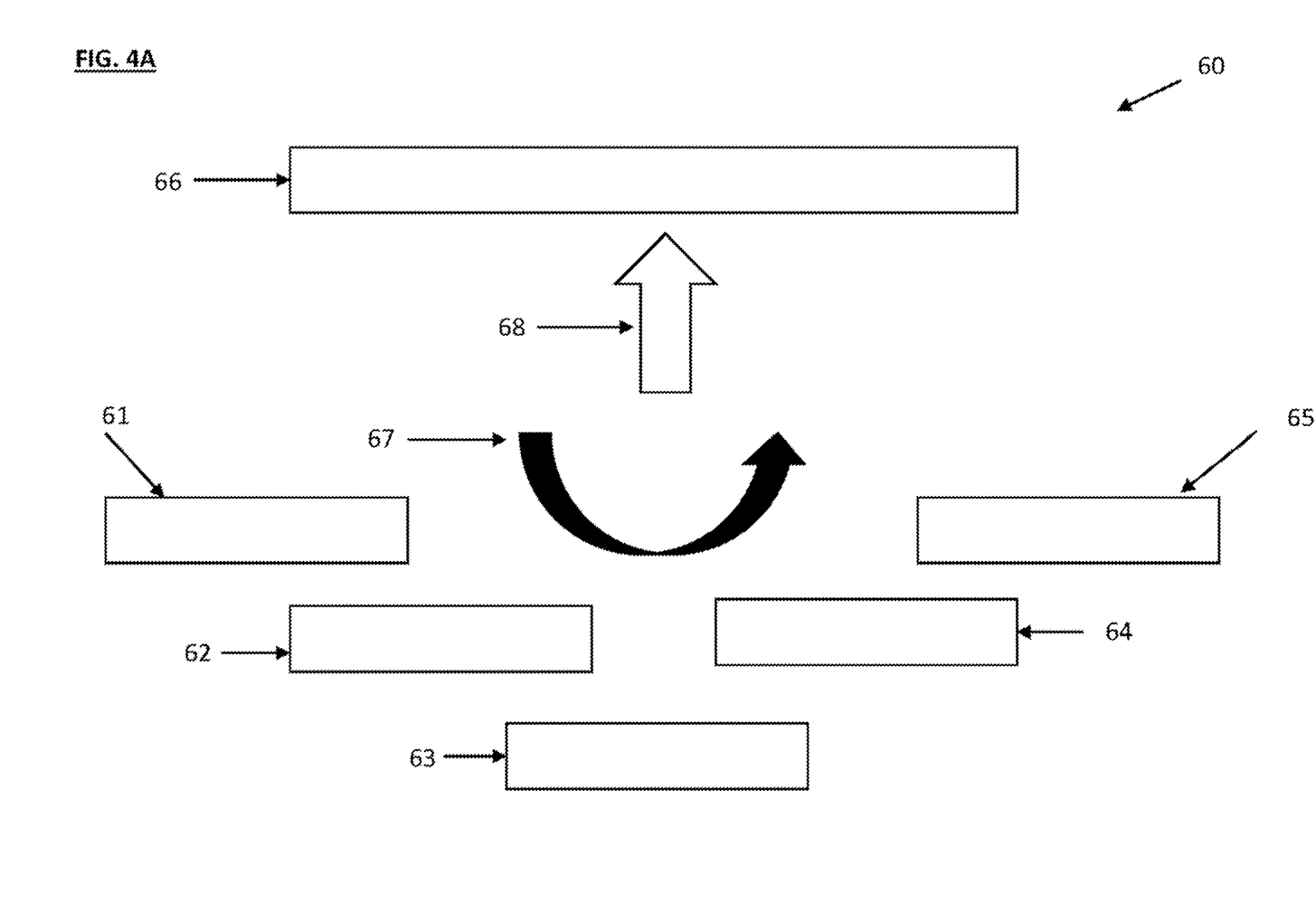
FIGS. 4A and 4B illustrate a method for increasing safety during the operation of a device according to a second embodiment.
Figure 4B:
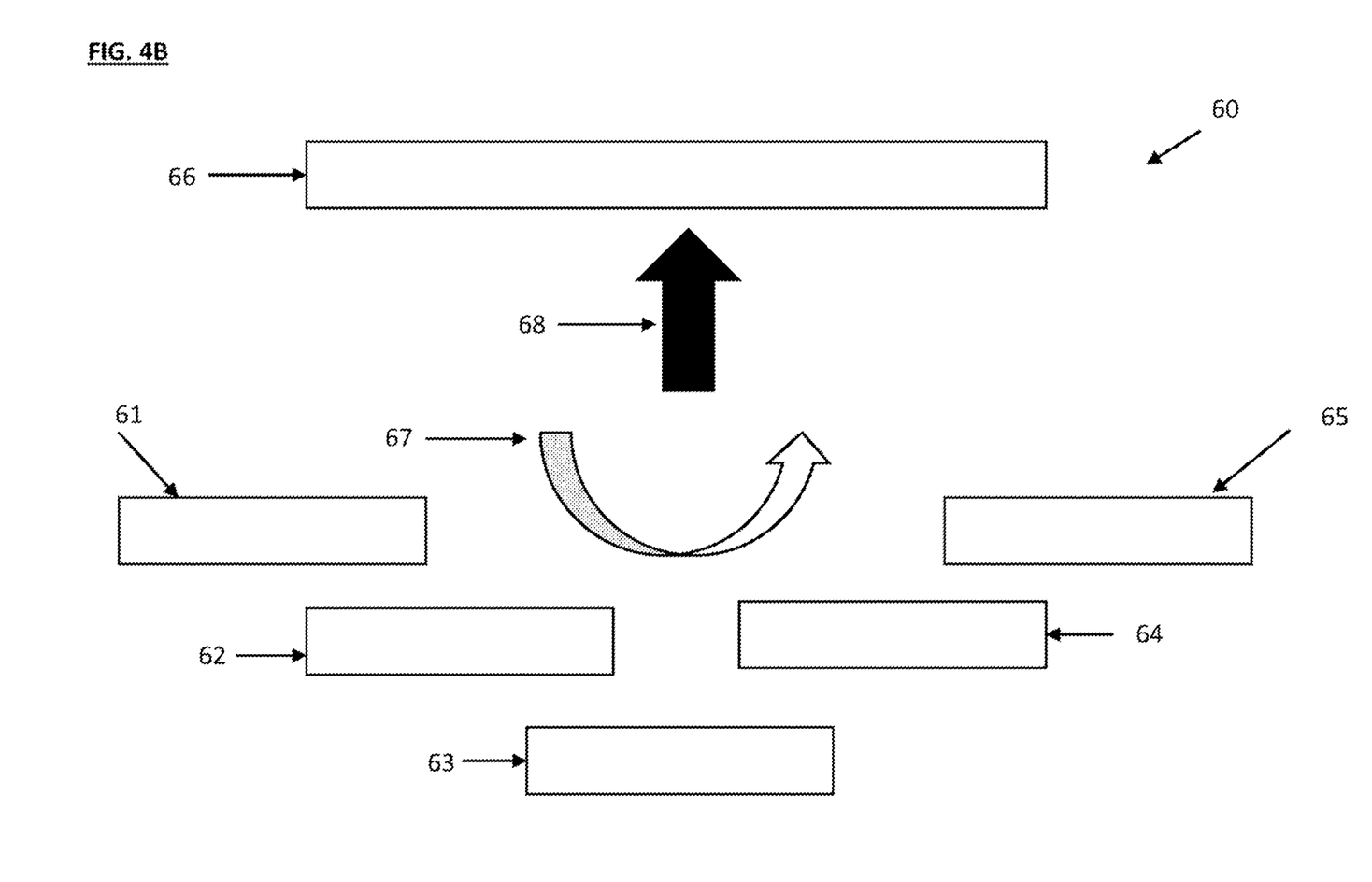

FIGS. 4A and 4B illustrate a method 60 for increasing safety during the operation of a device according to a first embodiment.

According to the second embodiment, six widgets 61, 62, 63, 64, 65, 66 are displayed on a graphical user interface. The first five widgets 61, 62, 63, 64, 65 are widgets assigned to operating functions that a user has selected in the past during corresponding situations requiring increased attention. These widgets 61, 62, 63, 64, 65 are thus displayed to provide quick access to these functions. By selecting the additional widget 66, the selection of the displayed widgets can be changed and, for example, it is possible to navigate between different levels, wherein the widgets displayed in individual levels are stored and thus predetermined.

According to the second embodiment, the widgets 61, 62, 63, 64, 65, 66 are again arranged here on the graphical user interface in such a way that, for selection of one of the widgets 61, 62, 63, 64, 65, a simple input gesture, in particular a rotational movement, which is very different from an input gesture required for selecting the additional widget 66, which is in particular a linear movement, is assigned in order to increase safety during the operation of the device. Thus, the first five widgets 61, 62, 63, 64, 65 can be selected in particular by a rotational movement with a finger or a hand, or a circular guiding of a trackball. The additional widget 66 can again be selected in particular by a forward movement with a finger or a hand, or by flicking a trackball forward.

As FIGS. 4A and 4B show, information 67, 68 relating to the input gestures assigned to the displayed widgets 61, 62, 63, 64, 65, 66 is also presented here, wherein the information 67, 68 is a graphical representation of the input gestures required to select the individual widgets 61, 62, 63, 64, 65, 66.

FIG. 4A shows here a situation during which a user selects one of the first five widgets 61, 62, 63, 64, 65 by a corresponding rotational movement, wherein the user can confirm the selection of one of the first five widgets 61, 62, 63, 64, 65 by a confirmation action, for example by pressing a trackball. Furthermore, however, it is also conceivable that individual positions on the graphical user interface are occupied twice, that is to say, two widgets are arranged in the vicinity of the corresponding position on the graphical user interface, wherein, for example, a horizontal flick of a trackball or a press of a trackball can be used to switch between these two widgets and the corresponding assigned operating functions. In this context, currently inactive widgets can be arranged at another position, for example at an edge of the graphical user interface, wherein a corresponding input apparatus can also be designed in such a way that a currently displayed widget is currently active, i.e. a corresponding interaction area is active, while the widgets that are currently not displayed or are displayed at another position, for example at an edge of the graphical user interface, are switched to inactive.

As FIG. 4A shows, the information 67 relating to the rotational movement is presented here clearly, while the information 68 relating to the input gesture required to select the additional widget 66 is only displayed schematically and recedes into the background during the rotational movement. In addition, the information 67 relating to the rotational movement can also be designed to still be displayed only schematically after a certain time, for example after 1.5s, or after a certain covered angular distance, for example 180°.

It should be noted here that, according to the second embodiment, the last-selected widget remains active after the corresponding input apparatus is switched off and on again, i.e., a cursor displayed on the graphical user interface does not jump back to its initial position when the corresponding input apparatus is switched off and on again.

FIG. 4B, in turn, illustrates a situation in which a user wishes to navigate to and select another level by selecting the additional widget 66.

As FIG. 4B shows, in this case the information 68 concerning the input gesture necessary to select the additional widget is clearly presented, while the information 67 concerning the rotational movement necessary to select the first five widgets 61, 62, 63, 64, 65 is only schematically presented and fades into the background. Furthermore, the first five widgets 61, 62, 63, 64, 65 can also be switched inactive during a selection of the additional widget 66 by a corresponding user interface control module, so that a situation in which one of the first five widgets 61, 62, 63, 64, 65 is accidentally selected in response to the input gesture is prevented.

The invention claimed is:

1. A method for increasing safety during the operation of a device, wherein a plurality of widgets are displayed on a graphical user interface, wherein each widget is assigned an operating function of the device, and wherein each operating function can be selected by selecting the corresponding widget by means of an input gesture that can be carried out by a user, the method comprising:

detecting data relating to a current situation;
determining whether increased attention is required in the current situation on the basis of the data relating to the current situation;
if it is determined that increased attention is required in the current situation, arranging the widgets displayed on the graphical user interface such that each widget is assigned a simple input gesture which differs greatly from input gestures assigned to other displayed widgets in order to increase safety during the operation of the device.

2. The method of claim 1, further comprising:
setting confidence intervals when assigning detected input gestures to individual widgets such that, if it is determined that increased attention is required in the current situation, each detected input gesture can be assigned to a displayed widget.

3. The method of claim 1, further comprising:
if it is determined that increased attention is required in the current situation, reducing a number of widgets displayed on the graphical user interface compared to a state in which increased attention is not required.

4. The method of claim 1, further comprising:
if it is determined that increased attention is required in the current situation, presenting at least one piece of information relating to the input gestures assigned to the displayed widgets.

5. The method of claim 1, further comprising:
displaying a detected input gesture in real time on a display apparatus.

6. The method of claim 1, wherein, in addition to executing an input gesture assigned to a widget, a confirmation action is also required to select the operating function assigned to the corresponding widget.

7. The method of claim 1, further comprising:
outputting a feedback signal once an operating function assigned to a widget has been selected.

8. An input apparatus for increasing safety during the operation of a device, comprising:
a graphical user interface configured to display a plurality of widgets, wherein each widget is assigned an operating function of the device, and each operating function is selectable by selecting the corresponding widget via an input gesture of a user;
an input unit configured to detect input gestures of the user;
a detection unit configured to detect data relating to a current situation;
a determination unit configured to determine whether increased attention is required in the current situation on the basis of the data relating to the current situation; and
a user interface control module configured to arrange the widgets displayed on the graphical user interface such that each widget is assigned a simple input gesture which differs greatly from input gestures assigned to other displayed widgets to increase safety during the operation of the device if it is determined by the determination unit that increased attention is required in the current situation.

9. The input apparatus of claim 8, wherein the user interface control module is further configured to, in response to the determination unit determining that increased attention is required in the current situation:
set confidence intervals in the assignment of detected input gestures to individual widgets such that each input gesture detected by the input unit can be assigned to a widget.

10. The input apparatus of claim 8, wherein the user interface control module is further configured to, in response to the determination unit determining that increased attention is required in the current situation:
reduce a number of widgets displayed on the graphical user interface compared to a state in which increased attention is not required.

11. The input apparatus of claim 8, wherein the user interface control module is further configured to, in response to the determination unit determining that increased attention is required in the current situation:
present at least one piece of information relating to the input gestures assigned to the displayed widgets on a display apparatus.

12. The input apparatus of claim 8, further comprising:
a display module configured to display, in real time on a display apparatus, an input gesture detected by the input unit.

13. The input apparatus of claim 8, further comprising:
a confirmation element configured to detect a confirmation action of a user, wherein the user interface control module is further configured to select an operating function assigned to a widget only when a corresponding input gesture is detected by the input unit and a confirmation action is detected by the confirmation element.

14. The input apparatus of claim 8, further comprising:
a feedback generator configured to output a feedback signal once an operating function assigned to a widget has been selected.

15. A motor vehicle, comprising:
the input apparatus of claim 8.

* * * * *